United States Patent [19]
Oh

[11] Patent Number: 5,808,842
[45] Date of Patent: Sep. 15, 1998

[54] HEAD DRUM ASSEMBLY FOR USE IN A MAGNETIC RECORDING/REPRODUCING APPARATUS

[75] Inventor: Se-Woog Oh, Seoul, Rep. of Korea

[73] Assignee: Daewoo Electronics Co., Ltd., Rep. of Korea

[21] Appl. No.: 851,441

[22] Filed: May 5, 1997

Related U.S. Application Data

[63] Continuation-in-part of Ser. No. 531,024, Sep. 20, 1995, abandoned.

[30] Foreign Application Priority Data

Nov. 21, 1994 [KR] Rep. of Korea ...................... 94-30747

[51] Int. Cl.⁶ ........................................................ G11B 5/53
[52] U.S. Cl. ............................................ 360/107; 360/109
[58] Field of Search ..................................... 360/107, 109, 360/128, 129, 130.2, 130.21, 130.22, 130.23, 130.24

[56] References Cited

U.S. PATENT DOCUMENTS 4,081,847  3/1978 Shimada et al. ......................... 360/107
4,123,791 10/1978 Rotter et al. ............................. 360/130
4,128,852 12/1978 Senkpiel ................................... 360/90
4,939,607  7/1990 Saito ....................................... 360/107

FOREIGN PATENT DOCUMENTS 4-028048  1/1992 Japan.
4-038646  2/1992 Japan.
5-342542 12/1993 Japan.

Primary Examiner—Stuart S. Levy
Assistant Examiner—William J. Klimowicz
Attorney, Agent, or Firm—Pennie & Edmonds LLP

[57] ABSTRACT

A head drum assembly for use in a magnetic recording/reproducing apparatus includes a member for supporting a tape in such a way that, the tape is allowed to smoothly come into contact with a head chip. The supporting member has a fixed portion for engaging with a rotary drum, a pair of extending portions outwardly extending from the fixed portion, two pairs of divided portions each pair of which are outwardly divided from the extending portion, and two pairs of bent portion, each of the bent portions angled toward side of the head chip and having an outer side for supporting the tape running in vicinity of the head chips, whereby the tape is allowed to smoothly come into contact with the head chip without getting damaged.

2 Claims, 4 Drawing Sheets

HEAD DRUM ASSEMBLY FOR USE IN A MAGNETIC RECORDING/REPRODUCING APPARATUS

CROSS REFERENCE TO RELATED APPLICATION

This application is a continuation-in-part of U.S. Ser. No. 08/531,024 filed on Sep. 20, 1995, now abandoned.

FIELD OF THE INVENTION

The present invention relates to a head drum assembly for use in a magnetic recording/reproducing apparatus; and, more particularly, to a head drum assembly which eliminates the need to form a head window on a periphery of a rotary drum incorporated therein during the manufacture thereof.

BACKGROUND OF THE INVENTION

As is shown in FIG. 1, a conventional head drum assembly 100 for use in a magnetic recording/reproducing apparatus normally includes a rotating shaft 1 divided into an upper part 101 and a lower part 102, a rotary drum 2 having a top surface, a bottom surface and a periphery, a flange 3, a stationary drum 4, an upper and a lower bearings 5, 5', a head base 6 and a head chip 6A.

The rotary drum 2 is joined with the upper part 101 of the rotating shaft 1 via the flange 3; the stationary drum 4 is attached to the lower part 102 of the rotating shaft 1 through the upper and the lower bearings 5, 5' at a predetermined distance from the rotary drum 2. Further, the rotary drum 2 is, on its periphery, formed with a head window 7 as will be described in later.

FIG. 2 represents an arrangement of the head base 6, the head chip 6A and a head window 7 in the conventional head drum assembly 100 of FIG. 1. As shown, the periphery of the rotary drum 2 is provided with a head window 7 having a predetermined width, and the head base 6 is attached to the bottom surface of the rotary drum 2 through a screw 8 so that the head chip 6A mounted thereon protrudes past the periphery of the rotary drum 2 through the head window 7.

In such a head drum assembly, the head window 7 is larger than the head chip 6A to allow a positional adjustment of the head chip 6A with a view to precisely scanning the tracks of the tape (T). In other words, the head window 7 must be larger than the head chip 6A in such a way that the posture of the head chip 6A coming into the contact with the tape is allowed to be adjusted.

However, since the head window is larger than the head chip, a tape may get wedged into the head window or may get damaged by colliding continuously with an edge part of the head chip during the operation thereof. In order to prevent such events from occurring, the head window must be formed with an extra care.

SUMMARY OF THE INVENTION

It is, therefore, a primary object of the invention to provide a head drum assembly which eliminates the need to form a head window on a periphery of a rotary drum incorporated therein during the manufacture thereof.

It is another object of the invention to provide a member for supporting a tape in such a way that the tape is allowed to smoothly come into contact with a head chip without getting damaged.

In accordance with one aspect of the present invention, there is provided a head drum assembly for use in a magnetic recording/reproducing apparatus comprising a rotating shaft, a rotary drum fixed to the rotating shaft, a stationary drum attached to the rotating shaft at a predetermined distance from the rotary drum; one or more head chips, each of which is mounted on a head base, attached on a bottom surface of the rotary drum and has two sides, and a member for supporting a tape in such a way that, the tape is allowed to smoothly come into contact with the head chips, wherein said supporting member includes a fixed portion for engaging with the rotary drum, a pair of extending portions outwardly extending from the fixed portion, two pairs of divided portions, each pair being outwardly divided from the extending portion, and two pairs of bent portion, each of the bent portions angled toward side of the head chip and having an outer side for supporting the tape running in vicinity of the head chips.

BRIEF DESCRIPTION OF THE DRAWINGS

The above and other objects and features of the instant invention will become apparent from the following description of preferred embodiments when takes in conjunction with the accompanying drawings, in which.

DETAILED DESCRIPTION OF THE PREFERRED EMBODIMENTS

Figure 3:
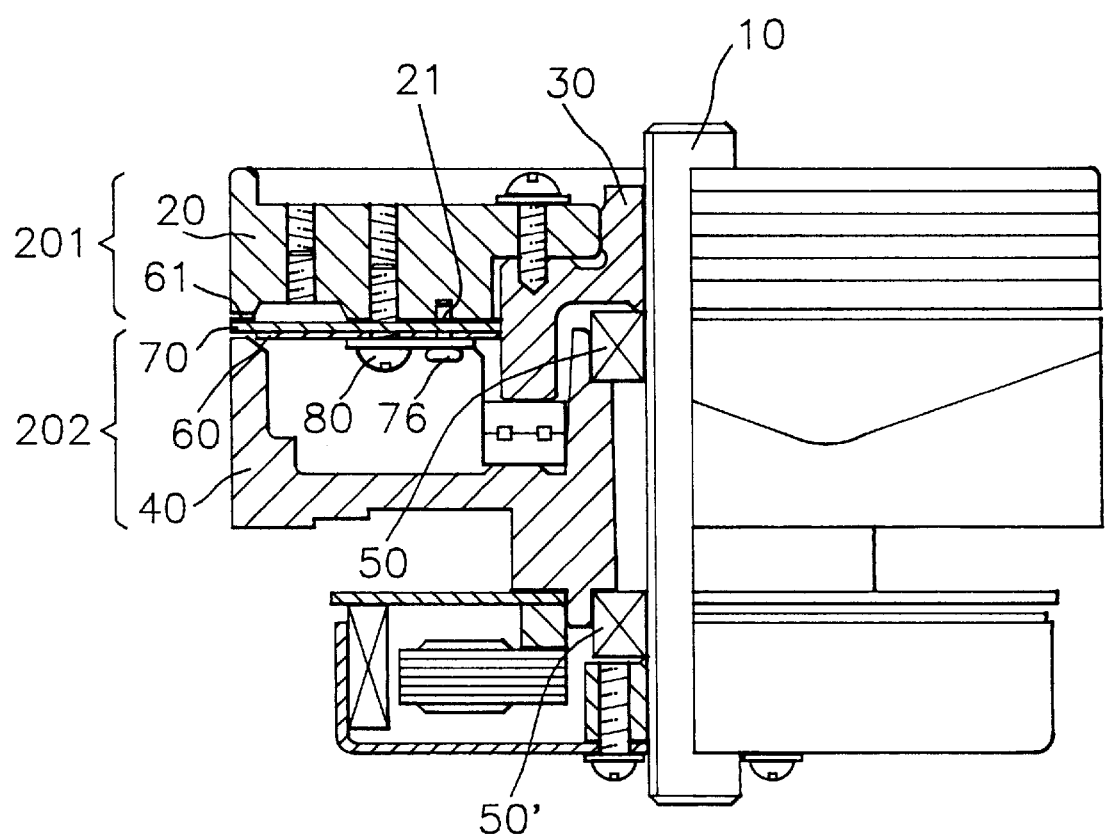
FIG. 3 illustrates a side view of the head drum assembly in accordance with the present invention with portions broken away for displaying an arrangement of the head drum assembly.

There is shown in FIG. 3 an inventive head drum assembly 200 for use in a magnetic recording/reproducing apparatus, comprising a rotating shaft 10 divided into an upper part 201 and a lower part 202, a rotary drum 20, a flange 30, a stationary drum 40, an upper and a lower bearings 50, 50', a head base 60, a head chip 61, a tape supporting member 70, and a fastening pin 76.

The rotary drum 20 having a top surface, a bottom surface and a periphery is joined to the upper part 201 of the rotating shaft 10 via the flange 30 fixedly pressed in the rotating shaft 10. Further, the rotary drum 20 is, on its bottom surface, formed with an arcuate slot 21 (see FIG. 4A) which is concentric with the rotary drum 20. The stationary drum 40 is attached to the lower part 202 of the rotating shaft 10 through the upper and the lower bearings 50, 50' at a predetermined distance from the rotary drum 20.

Figure 4A:
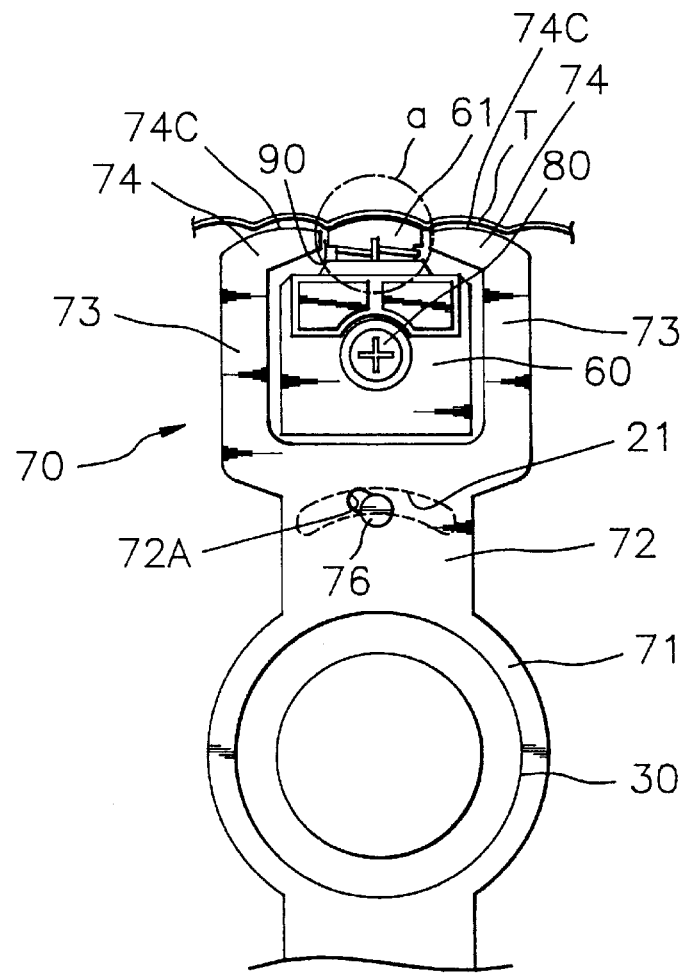
FIG. 4A offers a bottom view setting forth an arrangement of a head base, a head chip and a tape supporting member in accordance with the present invention of FIG. 3.
Figure 4B:
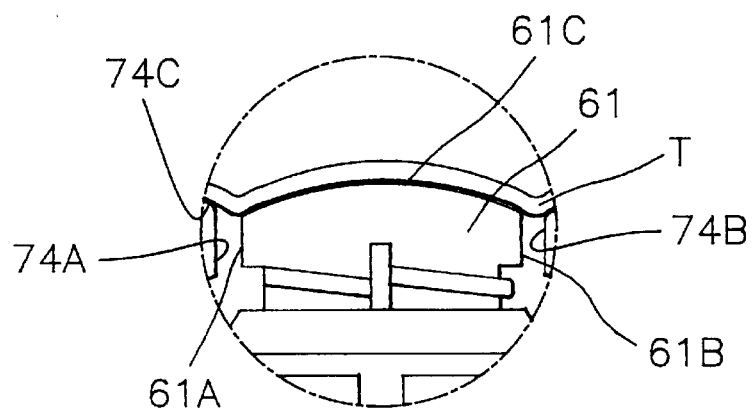
FIG. 4B depicts a partially expanded view of "a" part of FIG. 4A.

Referring to FIGS. 4A and 4B, there are shown an arrangement of a head base, a head chip and a tape supporting member in accordance with the present invention of FIG. 3, and a partially expanded view of "a" part of FIG. 4A, respectively.

As shown, the head chip 61 having two sides 61A, 61B and an outer side 61C for coming into contact with the tape (T) is mounted on the head base 60.

The tape supporting member 70 includes a fixed portion 71 fitted to the flange 30, an extending portions 72 outwardly extending from the fixed portion 71, a pair of divided portions 73 radially, outwardly divided from the extending portion 72, and a pair of bent portions 74 angled toward sides 61A, 61B of the head chip 61 so as to partially surround the head base 60. Further, the extending portion 72 has a hole 72A facing the arcuate slot 21; and each of the bent portions 74 has an outer side 74C for supporting the tape (T) running in vicinity of the head chip 61 and two sides 74A, 74B which face the sides 61A, 61B of the head chip 61, respectively.

Figure 1:
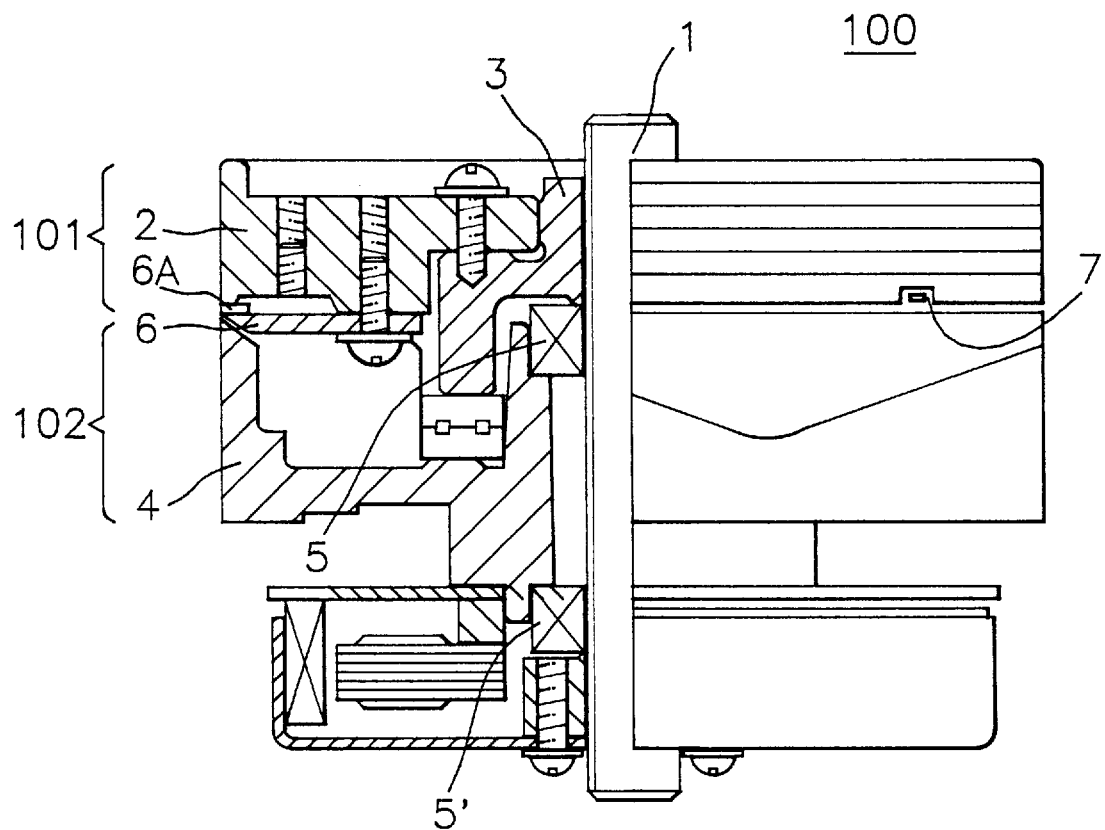
FIG. 1 shows a side view of the conventional head drum assembly with portions broken away for displaying an arrangement of the head drum assembly.
Figure 2:
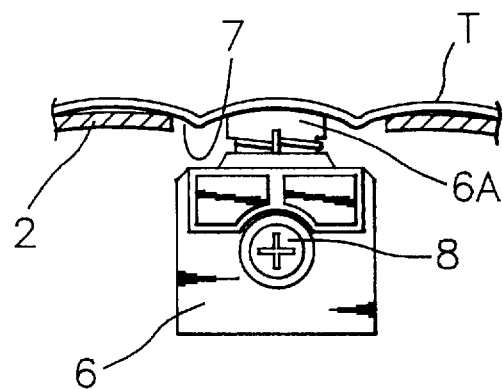
FIG. 2 represents a bottom view setting forth an arrangement of a head base, a head chip and a head window in the conventional head drum assembly of FIG. 1.
Figure 5:
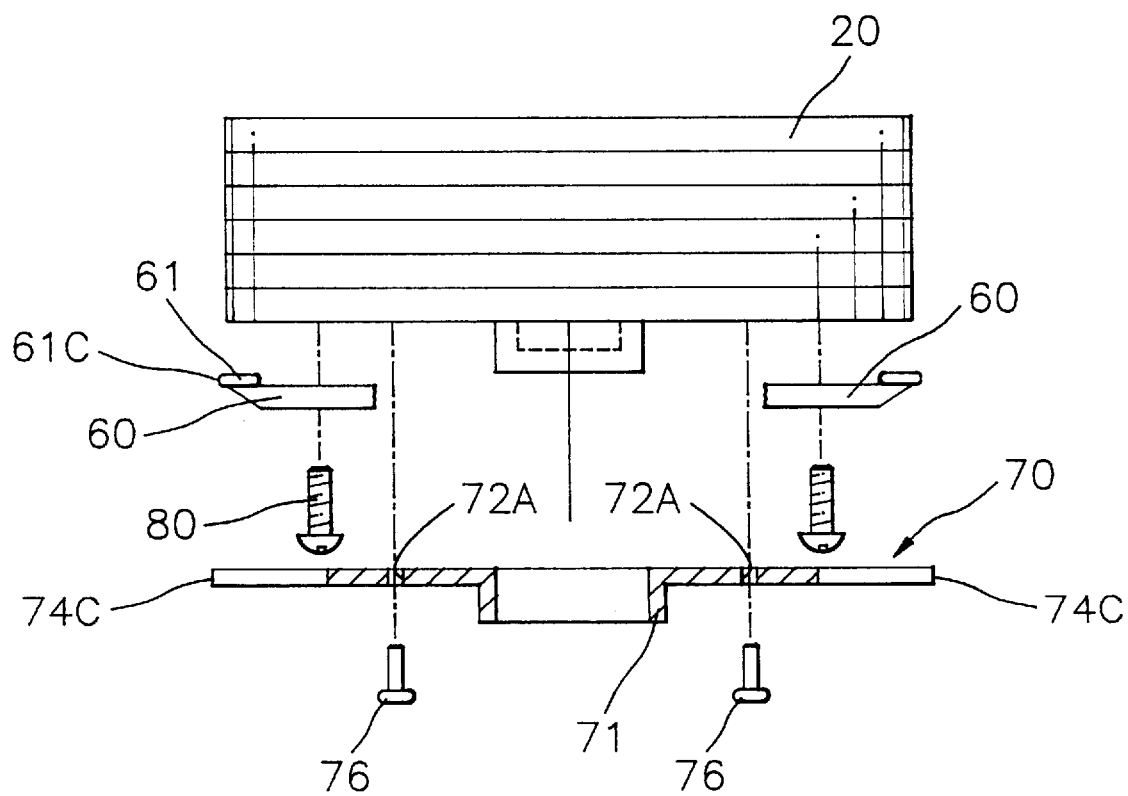
FIG. 5 presents an schematic exploded view of the head drum assembly in accordance with the present invention with portions broken away to show how the inventive supporting member is fastened to a rotary drum incorporated in the head drum assembly.

FIG. 5 illustrates an exploded view of the inventive head drum assembly 200. As shown, the head base 60 is fastened to the rotary drum 20 by screwing the screw 80 in and through a threaded hole (not shown) upwardly formed at the bottom surface of the rotary drum 20. Under this situation, the outer side 61C of the head chip 61 may protrude beyond past the periphery of the rotary drum 20 by a predetermined length so as to scan the tracks of the tape (T). The tape supporting member 70 is rotatably fitted to the flange 30 and located at a slot between the rotary drum 20 and the stationary drum 40. Finally, after the tape supporting member 70 is adjusted in such a way that the head chip 61 is allowed to smoothly scan the tracks of the tape (T) and its outer side 74C is allowed to suitably support the tape (T) running in vicinity of the head chip 61, the tape supporting member 70 is completely secured at the bottom surface of the rotary drum 20 by tightly fitting the fastening pin 76 in and through both of the hole 72A and the arcuate slot 21.

In accordance with the present invention, the tape supporting member eliminates the need for forming a head window on the periphery of the rotary drum during the manufacture of the head drum and allows the tape to smoothly come into contact with the head chip without getting damaged.

Although the invention has been shown and described with respect to the preferred embodiment, it will be understood by those skilled in the art that various changes and modifications may be made without departing from the scope of the invention as defined in the following claims.

What is claims is:

1. A head drum assembly for use in a magnetic recording/reproducing apparatus comprising:

a rotating shaft;

a flange fixedly pressed in the rotating shaft;

a rotary drum fixed to the rotating shaft via the flange and having an arcuate slot on the bottom surface thereof;

a stationary drum attached to the rotating shaft through bearing means at a predetermined distance from the rotary drum;

one or more head chips, each of which is mounted on a head base, attached on a bottom surface of the rotary drum;

a member for supporting a tape in such a way that, the tape is allowed to smoothly come into contact with the head chips, wherein said supporting member includes a fixed portion for engaging with the rotary drum, a pair of extending portions outwardly extending from the fixed portion, two pairs of divided portions, each pair being outwardly divided from the extending portion, and two pairs of bent portion, each of the bent portions angled toward the head chip and having an outer side for supporting the tape running in vicinity of the head chips, and means for position adjusting the tape supporting member, wherein the adjusting means includes a fastening pin and a hole being formed at the extending portion of the tape supporting member such that the tape supporting member is secured to the rotary drum by fitting the fastening pin in and through both of the hole and the arcuate slot.

2. The head drum assembly of claim 1, wherein said tape supporting member is fitted to the flange and located between the rotary drum and the stationary drum.

* * * * *